United States Patent [19]

Muraoka et al.

[11] 4,137,430

[45] Jan. 30, 1979

[54] SYSTEM FOR RECORDING A SIGNAL WITH TRACING AND TRACKING DISTORTION COMPENSATION ON A RECORD DISC

[75] Inventors: Teruo Muraoka, Sagamihara; Kohji Seki, Ichikawa, both of Japan

[73] Assignee: Victor Company of Japan, Ltd., Yokohama, Japan

[21] Appl. No.: 698,734

[22] Filed: Jun. 22, 1976

[30] Foreign Application Priority Data

Jun. 24, 1975 [JP] Japan .................................. 50-76935

[51] Int. Cl.[2] .................................................. G11B 3/00

[52] U.S. Cl. ........................ 179/100.4 C; 179/100.4 ST

[58] Field of Search ............... 179/100.4 C, 100.4 ST, 179/100.1 TD, 1 GQ

[56] References Cited

U.S. PATENT DOCUMENTS

| | | | |
|---|---|---|---|
| 3,229,048 | 1/1966 | Fox | 179/100.4 C |
| 3,403,233 | 9/1968 | Cooper | 179/100.4 C |
| 3,457,374 | 7/1969 | Klep et al. | 179/100.4 C |
| 3,484,566 | 12/1969 | Kuriyagawa | 179/100.4 C |
| 4,010,333 | 3/1977 | Muraoka et al. | 179/100.4 C |

FOREIGN PATENT DOCUMENTS

| | | | |
|---|---|---|---|
| 1089291 | 11/1967 | United Kingdom | 179/100.4 C |
| 1118381 | 7/1968 | United Kingdom | 179/100.4 C |

OTHER PUBLICATIONS

Cooper, Continuous Delay Regulator for Controlling Recording Errors, J. of the AES, vol. 14, No. 1, 1/66, pp. 7–16.

Shigetaka et al., Development of Skew-Sampling Compensator for Tracing Errors, J. of the AES, vol. 21, No. 8, pp. 630–634, 10/73.

Interaction of Tracing and Tracking Error, Cooper, J. of the AES, vol. 13, No. 2, 4/65, pp. 138–141.

Cooper, Integrated Treatment of Tracing and Tracking Error, J. of the AES, vol. 12, No. 2, 1/64, pp. 2–7.

*Primary Examiner*—Raymond F. Cardillo, Jr.

[57] ABSTRACT

In a record disc recording system for recording a signal f(t), the cutter stylus has a cutting angle $\theta$ and operates responsive to a signal to be recorded on a record disc. A tracing and tracking distortion compensation circuit operates, upon being supplied with the recording signal f(t), to produce an output signal $T_p^{-1}\{f(t)\}$ as expressed by the following equation, and to supply the same as the signal to be recorded by the cutter stylus.

$$T_p^{-1}\{f(t)\} = f(t) - \frac{r\cos\theta}{2V^2}\{\dot{f}(t)\}^2\left[1 + \frac{\sin\theta\cdot\dot{f}(t)}{V} - \frac{r\cos\theta\cdot\ddot{f}(t)}{V^2}\right],$$

where r is the radius of the tip of a reproducing stylus to be used for reproducing the recorded signal from the disc, V is the relative linear velocity of the reproducing stylus relative to the sound groove of the record disc, $$\dot{f}(t) \text{ equals } \frac{d\{f(t)\}}{dt}, \text{ and}$$

$$\ddot{f}(t) \text{ equals } \frac{d\{\dot{f}(t)\}}{dt}.$$

The cutter operates responsive to the signal $T_p^{-1}\{f(t)\}$. The reproducing stylus reproduces the signal thus recorded without tracing and tracking distortion.

6 Claims, 14 Drawing Figures

SYSTEM FOR RECORDING A SIGNAL WITH TRACING AND TRACKING DISTORTION COMPENSATION ON A RECORD DISC

BACKGROUND OF THE INVENTION

This invention relates generally to record disc recording systems and more particularly to systems for recording signals with waveforms that produce no tracing and tracking distortion at the time of record disc reproduction.

In general, in a recording system for record discs, a cutting stylus records a signal in a groove of V-shaped cross section. In the reproducing system, the signal thus recorded is reproduced by a pickup reproducing stylus tracing the groove of the record disc. Since the tip of the reproducing stylus has a certain finite diameter, the locus or path of the center of the reproducing stylus differs from the path of the center of the cutting stylus. The reproduced signal thus acquires a tracing distortion, which causes a deterioration of the tone quality of the reproduced sound.

In a system known as a discrete 4-channel system, an angle-modulated wave difference signal is superimposed on a direct-wave sum signal, thereby to record a four-channel signal on a record disc. When there is a tracing distortion in the reproduced signal, there is both a deterioration in the tone quality of the reproduced sound, and an undesirable leakage of the direct-wave signal due to its cross modulation into the demodulated output of the angle-modulated wave. There is an interference of the distortion of the direct-wave signal with the angle-modulated wave signal, giving rise to abnormal noise in the demodulated output of the angle-modulated wave signal.

Accordingly, it is a general practice to impart a distortion into the recording sound signal. This distortion is opposite to the tracing distortion. The aim is to prevent the tracing distortion in the reproduced signal. This technique has been known in the prior art as, for example, the correlator system and the skew-sampling system.

However, none of these known systems for correcting tracing distortion has been successful in fully correcting tracing distortion. It has not been possible to completely prevent the occurrence of the above described difficulties accompanying tracing distortion.

The reason for this is that correction of tracing distortion has heretofore been carried out with attention concentrated only on making the motion of the cutting stylus coincident with the motion of the reproducing stylus. The premise has been that the waveform of the recorded signal and the waveform of the sound groove which has been cut are the same.

However, when the relationship between these waveforms was thoroughly studied, it was found that the recorded waveform does not coincide accurately with the waveform of the sound groove which has been cut. On the basis of this noncoincidence between the two waveforms, tracking distortion also occurs at the time of reproduction. Until now, however, this noncoincidence between the two waveforms merely has been pointed out. It has been overlooked in conventional 2-channel stereo systems, since it has no deleterious effect, in actual practice.

However, to attain reproduction of even higher fidelity, it is desirable to remove the above described tracing and tracking distortion. Furthermore, in discrete 4-channel systems, this tracing and tracking distortion gives rise to noise in the demodulated signal of the angle-modulated wave signal and has become a problem which cannot be neglected.

SUMMARY OF THE INVENTION

Accordingly, a general object of the invention is to provide a novel and useful record disc recording system by which a signal can be recorded on a record disc in a manner which prevents tracing and tracking distortion.

Another object of the invention is to provide a record disc recording system which cuts a recording signal on a record disc in a manner which prevents tracing and tracking distortion at the time of reproduction. Here, an object is to use a new equation derived with consideration also given to the noncoincidence between the waveform of the sound groove and the waveform of the recording signal.

Other objects and further features of the invention will be apparent from the following detailed description with respect to preferred embodiments of the invention when read in conjunction with the accompanying drawings.

DETAILED DESCRIPTION

In general, tracing distortion can be represented (FIG. 1) as the difference between the tracing wave T and sound groove G. Wave T is the locus or travel path of the foremost or tip end of a ball having a radius r rolling along sound groove G in a record disc, and the sound groove waveform G. The analysis of this representation was initiated by the studies of Pierce and Hunt, and others, in 1938. When the sound groove waveform G is assumed to be the same as the waveform of the recording signal f(t), and the function representing tracing distortion is considered to be $T_T\{f(t)\}$, this function $T_T\{f(t)\}$ can be represented, as is known, by the following Eq.(1), omitting higher order terms over third:

$$T_T\{f(t)\} = f(t) + \frac{C}{2}\{\dot{f}(t)\}^2[1 + C\ddot{f}(t)] \quad (1)$$

where:

$C = r/V^2$;

r is the radius of the tip of the reproducing stylus;

V is the relative linear velocity of the sound groove relative to the reproducing stylus;

$$\dot{f}(t) = \frac{d\{f(t)\}}{dt}\text{; and } \ddot{f}(t) = \frac{d\{\dot{f}(t)\}}{dt}$$

Here a number of functions for representing conversion of a signal, like $T_T\{f(t)\}$, will be described in the present specification. The following rules are determined beforehand:

f(t) is the signal waveform to be subjected to conversion function, g(t) is the signal waveform obtained responsive to the conversion function.

The signal conversion function is expressed by a polynominal, in which terms are expressed up to the third order. The higher order terms (above the third) are omitted because they have, in general, a small amplitude and high frequencies. These higher order terms are not important in their quantitative contribution to whole distortion component and in reducing distortion when they are used as a distortion compensation function.

In a known system for compensating for tracing distortion, a waveform distortion which is the inverse function $T_T^{-1}\{f(t)\}$ is imparted to the recording signal before it is recorded. (The inverse function of a function F is herein expressed as $F^{-1}$.) Then, $$T_T^{-1}\{f(t)\} = f(t) - \frac{C}{2}\{\dot{f}(t)\}^2[1 - C\ddot{f}(t)] \quad (2).$$

The waveform g(t), at the time when this signal is traced by the reproducing stylus, is given by the following equation:

$$g(t) = T_T[T_T^{-1}\{f(t)\}] = f(t) \quad (3).$$

In the known system, it is supposed that the original signal f(t) is faithfully reproduced.

This known system is based on the premise that the waveform of the recording signal f(t) is equal to the sound groove waveform G. In the actual case, however, the sound groove waveform G, as cut and formed by a cutting stylus, is not equal to the waveform of the recording signal f(t) supplied to the cutter. Therefore, the generation of tracing distortion in the reproducing system cannot be fully prevented by imparting the inverse function $T_T^{-1}\{f(t)\}$, of the tracing distortion function, to the recording signal.

Figure 2:
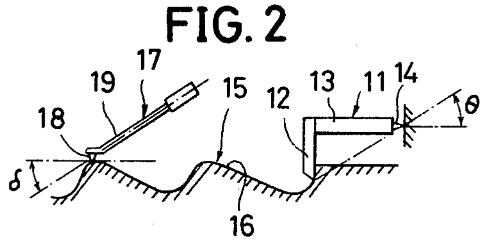
FIG. 2 is a diagram indicating the cutting angle of a record disc cutter and the tracking angle of a pickup device.
Figure 3:
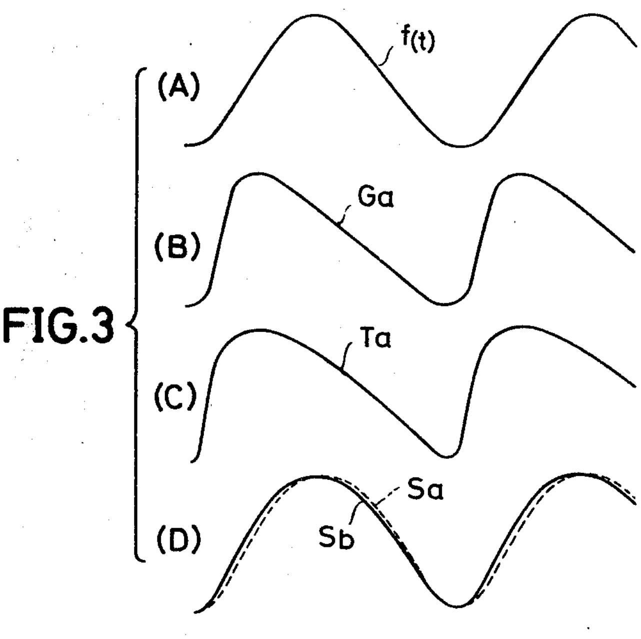
FIGS. 3(A) through 3(D) are waveform diagrams respectively for describing distortions of waveforms.

This noncoincidence between the waveform of the recording signal f(t) and the sound groove waveform G arises from the following cause. As indicated in FIG. 2, a sound groove cutter 11, in general, has a cutting angle $\theta$, which is in the order of 15 to 20 degrees. This cutting angle $\theta$ designates the angle between the horizontal plane and a line joining the cutting tip of the cutting stylus 12 and the pivotal support point 14 of an arm 13 for supporting the cutting stylus 12. As a consequence, if the recording signal f(t) supplied to the cutter 11 has the inverse function of the tracing distortion function, there is a waveform as indicated in FIG. 3(A). FIG. 3(B) shows the waveform Ca of the sound groove 16 which records the cutting stylus 12 on the record disc 15.

More specifically, because of the cutting angle $\theta$, the sound groove waveform Ga differs from the waveform of the recording sound signal f(t). When this sound groove waveform Ga is traced by the reproducing stylus 18 of a pickup device 17, the traced waveform becomes as indicated by curve Ta in FIG. 3(C). As a consequence, the waveform of the reproduced signal obtained from the pickup device 17 becomes as indicated by curve Sb in FIG. 3(D). Curve Sb differs from the waveform Sa which would be obtained if the signal reproduced from the sound groove waveform Ga were equal to the waveform f(t) of the recording signal. Even if the angle $\delta$ between the horizontal plane and the cantilever 19 of the pickup device 17 is made equal to the cutting angle $\theta$, the waveform of the reproduced signal is indicated by the curve Sb since the tip of the reproducing stylus 18 has a certain finite radius.

Figure 4:
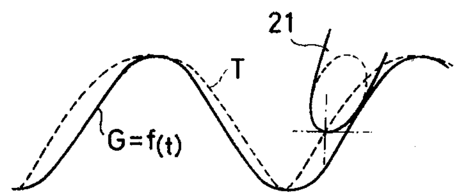
FIG. 4 is a diagram for describing the generation of a tracing and tracking distortion.

The trace waveform Ta results from tracing the sound groove Ga, which is different from a waveform of the signal f(t). This difference is a result of the cutting angle $\theta$ of the cutting device 11. As indicated in FIG. 4, this trace waveform Ta is the same as the travel path described by the foremost end of a reproducing stylus 21 of ellipsoidal shape, with an inclined tip, when tracing a sound groove G of the same waveform as the signal f(t).

The cut sound groove waveform Ga is not equal to the recording signal waveform f(t) because of the cutting angle $\theta$. This noncoincidence gives rise to a tracing and tracking distortion, which is slightly different from the tracing and tracking distortion conventionally considered based upon Hunt's analysis and is not detrimental in actual practice. Other disclosures have been made in, for example, J.A.E.S, Vol. 13, No. 2, "Interaction of Tracing and Tracking Error" by D. H. Cooper.

A discrete 4-channel system has multiplexed signals of two direct-wave sum signals and two angle-modulated wave difference signals which are recorded on and reproduced from a record disc as disclosed in U.S. Pat. Nos. 3,686,471, and 3,883,699.

Figure 5:
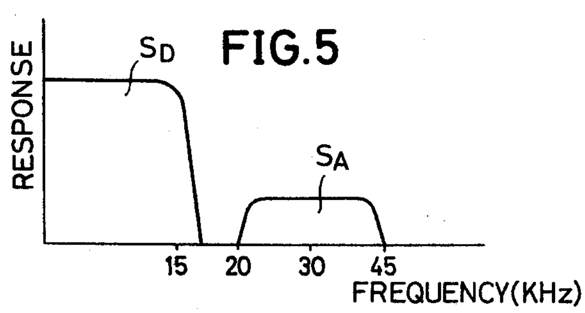
FIG. 5 is a graph indicating the frequency bands of multiplexed signals in a discrete system.
Figure 6:
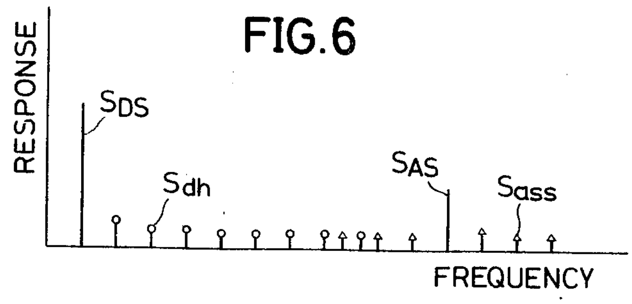
FIG. 6 is a frequency spectrum diagram for a description of interference between an angle-modulated wave signal of higher harmonic and a direct-wave signal in a discrete system.

In this discrete 4-channel system, as indicated in FIG. 5, a direct-wave signal $S_D$ and an angle-modulated wave signal $S_A$ are multiplexed and recorded on one side wall of the record sound groove. The direct wave $S_D$ is a sum signal of a first channel signal and a second channel signal which occupies a band of 0 to 15 KHz. The modulated wave signal $S_A$ is a difference signal of the first and second channel signals and occupies a band of 20 KHz to 45 KHz. Third and fourth channel signals are similarly multiplexed and recorded on the other side wall of the sound groove. These signals $S_D$ and $S_A$ may be respectively represented by a spectrum, as indicated by $S_{DS}$ and $S_{AS}$ in FIG. 6.

When there is distortion in the reproduced multiplexed signal, a higher harmonic wave Sdh (indicated by a circular mark above a vertical line in FIG. 6) of the direct-wave signal $S_{DS}$ is produced. This harmonic enters into the range of the side band Sass (indicated by a triangular mark above a vertical line) of the angle-modulated wave $S_{AS}$. This higher harmonic component Sdh interfers with the side band Sass of the angle-modulated wave. Therefore, noise is generated in the signal obtained by demodulation of the angle-modulated wave. Furthermore, cross-talk is produced.

Therefore, if distortion due to the above mentioned noncoincidence of waveforms is present in a reproduced signal, it will give rise to the above described undesirable results, particularly in the discrete 4-channel system.

In a discrete 4-channel system, the multiplexed recording signal f(t) can be represented, as in the following equation, in terms of the direct wave signal D(t) and the angle-modulated wave signal Ecosωct.

$$f(t) = D(t) + E\cos\omega ct \tag{4}$$

where:

E is the amplitude of the carrier wave; and

ωc is the frequency of the carrier wave.

For simplification, it is assumed that the carrier wave is not modulated.

Figure 1:
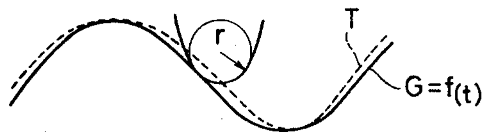
FIG. 1 is a graphical diagram for explaining the reason for tracing distortion at the time of reproduction of a record disc.

When there is a tracing distortion as indicated in FIG. 1, the angle-modulated wave signal C(t) which has been picked up is as follows:

$$C(t) = -\omega c^2[C\dot{D}(t) + 2C^2\dot{D}(t)\ddot{D}(t)]\cos\omega ct - \omega c[\mu + C\ddot{D}(t) - \frac{C^2}{2}\omega c^2\{\dot{D}(t)\}^2 + \ldots\ldots]\sin\omega ct \tag{5}$$

where: $C = r/V^2$ and $\mu = 1 - \frac{1}{8}C^2E^2\omega c^4$. Since E denotes the amplitude of the carrier wave, it has no relation to the description of amplitude fluctuation, and is omitted.

From Eq.(5), the output $e_o(t)$ obtained by demodulating the angle-modulated wave can be determined as follows:

$$e_o(t) = \frac{C\omega c}{\mu}(\ddot{D}(t) + C(2 - \frac{1}{\mu})[\{\ddot{D}(t)\}^2 + \dot{D}(t)\dddot{D}(t)] + \frac{C^2\omega c^2}{2\mu}\{\dot{D}(t)\}^2\ddot{D}(t)) \tag{6}$$

If factors, such as tracing distortion arising when the cutting angle θ is not zero, are also considered, the above Eqs.(5) and (6) become as given by the following Eqs.(7) and (8):

$$C(t) = -\omega^2c\,\dot{D}(t)[C + \frac{3}{2}AC\dot{D}(t) + 2C^2\ddot{D}t]\cos\omega ct - \omega c[\mu + C\ddot{D}(t) - \frac{C^2}{2}\omega^2c\{\dot{D}(t)\}^2]\sin\omega ct \tag{7}$$

$$e_o(t) = \frac{C\omega c}{\mu}(\ddot{D}(t) + 3A\dot{D}(t)\ddot{D}(t) + C(2 - \frac{1}{\mu})[\{\ddot{D}(t)\}^2 + \dot{D}(t)\dddot{D}(t)] + \frac{C^2}{2\mu}\omega^2c\{\dot{D}(t)\}^2\ddot{D}(t)) \tag{8}$$

Where:

$$C = \frac{r\cos\theta}{V^2}$$

$$A = \frac{\sin\theta}{V}$$

Figure 7:
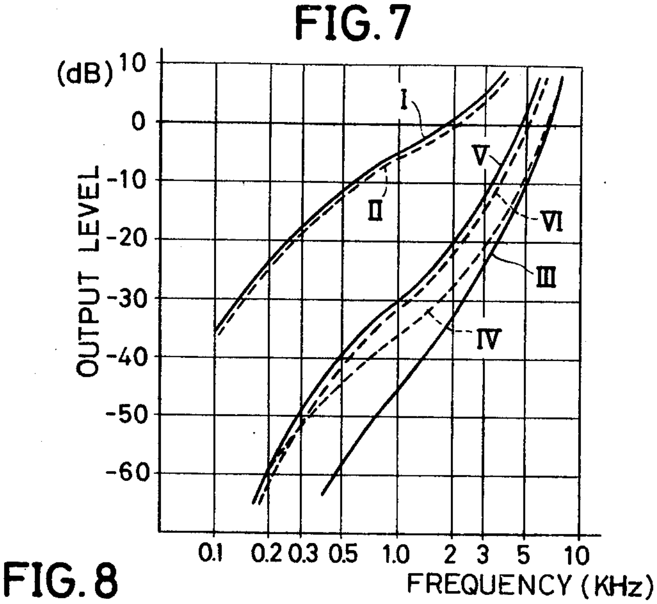
FIG. 7 is a graph indicating leakage levels of a direct-wave signal component having distortion in the demodulated output of an angle-modulated wave signal.

As a result of the interference due to tracing distortion of the direct-wave signal with respect to the angle-modulated wave signal, the leakage component of the direct-wave signal accompanied by distortion appearing in the demodulated output of the angle-modulated wave signal becomes as indicated by curve I or II in FIG. 7. The secondary distortion thereof becomes as indicated by curve III or IV, and the tertiary distortion becomes as indicated by curve V or VI. Of these, curves I, III, and V are for the cutting angle θ when zero, while curves II, IV, and VI are for the cutting angle θ when 20 degrees. FIG. 7 represents weighting the computations by using Eqs.(6) and (8) with an equalizing curve intrinsically characteristic of a discrete system where a level of the direct-wave signal is equal to the reference level in a record of the discrete system, a reproducing stylus tip diameter of 7μm, a sound groove radius of 130 mm., and a disc rotational speed of 33⅓ rpm.

As is apparent from FIG. 7, the interference of the direct-wave signal is pronounced, and the quantity of distortion is also great. Furthermore, if the cutting angle θ is 20 degrees, the secondary distortion component of the leakage signal is especially large.

The angle-modulated wave signal C(t) and the demodulated output $e_o(t)$, where the multiplexed signal f(t) in the discrete system record can be represented by Eq.(4), and where the known tracing distortion compensation system is applied, can be determined as follows:

$$C(t) = -\frac{3}{2}\omega^2cAC\{\dot{D}(t)\}^2\cos\omega ct - \omega c[1 + 3AC\dot{D}(t)\ddot{D}(t)]\cdot\sin\omega ct \tag{9}$$

$$e_o(t) = 3AC'\omega cD(t)D(t) \tag{10}$$

Figure 8:
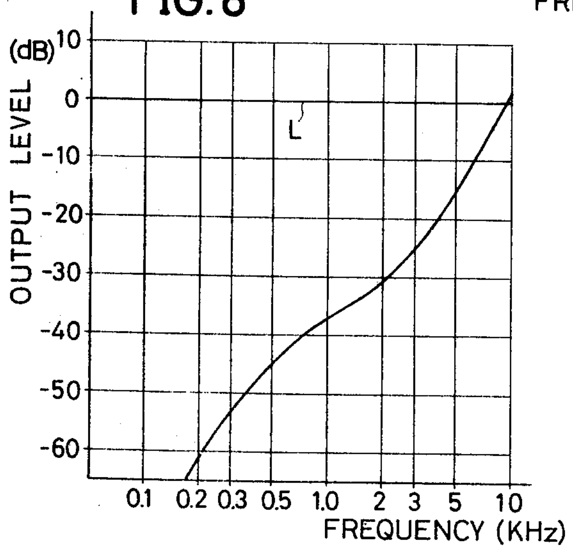
FIG. 8 is a similar graph indicating the leakage level of a direct-wave signal component appearing in the demodulated output of an angle-modulated wave signal.

FIG. 8 shows the leakage component of the direct wave signal, which results from weighting the calculation by introducing conditions such as a cutting angle θ of 20 degrees, a reproducing stylus tip radius of 7 μm, a sound groove diameter of 130 mm, and a disc rotational speed of 33⅓ rpm into Eq.(10), with an equalizer curve characteristic of the discrete system. The secondary distortion component of the direct-wave signal in the vicinity of 10 KHz has increased to a large value, exceeding the reference level L.

When a known tracing distortion correcting system is applied to a discrete system in the above described manner, a tracing and tracking distortion is caused by the noncoincidence between the waveform of the recording signal and the waveform of the cut sound groove. This gives rise to a remarkable increase in distortion in the reproduced sound, particularly at high frequencies above 2 KHz.

The present invention overcomes this problem by compensating for tracing and tracking distortion with consideration given to the noncoincidence between the waveform of the recording signal and the sound groove waveform.

The function $T_p$ represents the tracing distortion which actually arises at the time of reproducing of a record. This distortion can be expressed by the Eq.(11) in terms of a function Tc{f(t)} (cutting transformation function) denoting cutting distortion, a function $T_T\{f(t)\}$ (tracing transformation function) denoting tracing distortion, and a function $T_A\{f(t)\}$ (tracking transformation function) denoting tracking distortion:

$$Tp\{f(t)\} = T_A(T_T[Tc\{f(t)\}]) \quad (11)$$

The function $T_T\{f(t)\}$ represents tracing distortion in this Eq.(11) and is already given in Eq.(1). The function Tc representing cutting distortion and the function $T_A\{f(t)\}$ representing tracking distortion are here determined.

Figure 9:
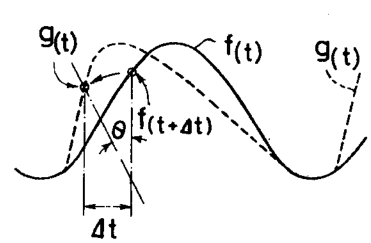
FIG. 9 is a graph indicating the relationship between the waveform of a recording signal and the waveform of a sound groove cut by a cutter having a cutting angle.

In FIG. 9, the full line curve f(t) is the waveform (waveform of the original signal) of the recording signal f(t). The intermittent line curve g(t) is the recording signal waveform (sound groove waveform) g(t) produced when the signal f(t) is recorded by a cutter having a cutting angle $\theta$.

The waveform f(t) of the recording signal and the sound groove waveform g(t) in FIG. 9 have the following relationship:

$$g(t) = Tc\{f(t)\} \quad (12)$$

where Tc{f(t)} is a function denoting the cutting distortion.

As is apparent from FIG. 9, the following relationships are valid with the linear velocity of the sound groove denoted by V:

$$\left.\begin{aligned} g(t) &= f(t + \Delta t)\cos\theta \\ \Delta t &= \frac{1}{V} f(t + \Delta t)\sin\theta \end{aligned}\right\} \quad (13).$$

Therefore, the sound groove waveform g(t) is given by the following equation:

$$\begin{aligned} g(t) &= \cos\theta \cdot f\left\{ t + \frac{1}{V}\tan\theta \cdot g(t) \right\} \quad (14). \\ &\neq \cos\theta f(t) + \frac{\sin\theta}{V}\dot{f}(t)\, g(t) \end{aligned}$$

By solving Eq.(14), the following relationship is obtained:

$$\begin{aligned} g(t) &= \frac{\cos\theta\, f(t)}{1 - \frac{\sin\theta}{V}\{\dot{f}(t)\}} \quad (15) \\ &= \alpha f(t)[1 + A\{\dot{f}(t)\} + A^2\{\dot{f}(t)\}^2] \end{aligned}$$

where: $\alpha = \cos\theta$, $A = \sin\theta/V$.

From Eq.(12), where $g(t) = Tc\{f(t)\}$, the cutting distortion function Tc can be derived in the following form:

$$Tc\{f(t)\} = \alpha f(t)[1 + A\{\dot{f}(t)\} + A^2\{\dot{f}(t)\}^2] \quad (16).$$

The function $T_A\{f(t)\}$ representing the tracking distortion can be obtained by determining the inverse-function of the function Tc representing the cutting distortion. This can be accomplished by determining the waveform of the recording signal f(t) from Eq.(15) representing the sound groove waveform g(t). From Eq.(15), the following equations are derived:

$$f(t) = \frac{1}{\alpha} g(t) - Af(t)\{\dot{f}(t)\} - A^2 f(t)\{\dot{f}(t)\}^2 \quad (17)$$

$$\dot{f}(t) = \frac{1}{\alpha}\dot{g}(t) - Af(t)\ddot{f}(t) - A\{\dot{f}(t)\}^2 - 2A^2 f(t)\dot{f}(t)\ddot{f}(t) - A^2\{\dot{f}(t)\}^3 \quad (18)$$

$$\ddot{f}(t) = \frac{1}{\alpha}\ddot{g}(t) - 3A\dot{f}(t)\ddot{f}(t) - Af(t)\dddot{f}(t) - 5A^2\{\dot{f}(t)\}^2\ddot{f}(t) - 2A^2 f(t)\{\ddot{f}(t)\}^2 - 2A^2 f(t)\dot{f}(t)\dddot{f}(t) \quad (19)$$

When the functions f(t) and $\dot{f}(t)$ are eliminated from the right-hand side of Eq.(17), the following equation is obtained:

$$f(t) = \frac{1}{\alpha}\left(g(t) - \frac{A}{\alpha} g(t)\dot{g}(t) + \left(\frac{A}{\alpha}\right)^2[\{g(t)\}^2\ddot{g}(t) + g(t)\{\dot{g}(t)\}^2]\right) \quad (20)$$

$$\text{where: } \frac{1}{\alpha} = \frac{1}{\cos\theta},\ \frac{A}{\alpha} = \frac{\tan\theta}{V}$$

Thus, an inverse function is obtained as in Eq.(20).

For expressing the function of tracking distortion (in accordance with the rule indicated at the beginning), f(t) in Eq. 20 is substituted for $T_A\{f(t)\}$, and g(t) in the same Equation is substituted for f(t). The tracking angle is designated $\delta$ for distinguishing it from the angle $\theta$ used on cutting. $\beta = 1/\cos\delta$, and $B = \tan\delta/V$, the function $T_A\{f(t)\}$ representing the tracking distortion can be expressed as follows:

$$T_A\{f(t)\} = \beta(f(t) - Bf(t)\dot{f}(t) + B^2[\{f(t)\}^2\ddot{f}(t) + g(t)\{\dot{g}(t)\}^2] \quad (21).$$

By substituting $T_T\{f(t)\}$ expressed by Eq.(1), Tc{f(t)} expressed by Eq.(16), and $T_A\{f(t)\}$ expressed by Eq.(21) into the expression of Tp{f(t)} in Eq.(11), the following equation is obtained:

$$\begin{aligned} Tp\{f(t)\} = \gamma(f(t) &+ [(A - \alpha B)f(t)\dot{f}(t) + \frac{\alpha C}{2}\{\dot{f}(t)\}^2] \\ &+ [(A - \alpha B)^2 f(t)\{\dot{f}(t)\}^2 + \alpha C(A - \alpha B)f(t)\dot{f}(t). \\ &\ddot{f}(t) + \alpha C(A - \frac{\alpha B}{2})\{\dot{f}(t)\}^3 - \alpha B(A - \alpha B)\{f(t)\}^2. \\ &\ddot{f}(t) + \frac{\alpha^2 C^2}{2}\{\dot{f}(t)\}^2\ddot{f}(t)]) \end{aligned} \quad (22).$$

The function Tp{f(t)}, indicating the tracking distortion generated at reproduction, is represented by the above Eq.(22).

In the above Eq.(22), $\alpha = \cos\theta$, $A = \sin\theta/V$, $B = \tan\delta/V$, and $\gamma = \cos\theta/\cos\delta$.

As a general rule, the cutting angle $\theta$ in the cutter and the tracking angle $\delta$ in the pickup should be made equal. Therefore, the tracing and tracking distortion function Tp generated in actual use is expressed by the following equation:

$$Tp\{f(t)\} = f(t) + \frac{\alpha C}{2}\{\dot{f}(t)\}^2[1 + A\dot{f}(t) + \alpha C\ddot{f}(t)] \quad (23)$$

From an examination of this Eq.(23), it is observed that a tertiary distortion appears in the tracing distortion which actually occurs at the time of reproduction, as indicated by Eq.(23). This tertiary distortion was not present in the tracing and tracking distortion considered heretofore in the prior art and already described in conjunction with FIG. 1.

This tertiary distortion can be expressed by the following equation:

$$\frac{\alpha C}{2} A\{\dot{f}(t)\}^3 \quad (24).$$

This tertiary distortion is caused by the cutting angle $\theta$.

Next to be considered is where the cutting angle $\theta$ is assumed to be equal to 0°. It will be observed that this assumption corresponds to the tracing distortion which arises in accordance with the conventional mechanism for generating tracing distortion, as indicated in FIG. 1. In this case, A becomes zero and $\alpha$ becomes 1 (unity) in Eq.(23). Consequently, Eq.(23) becomes as follows:

$$Tp\{f(t) = f(t)\} + \frac{C}{2}\{\dot{f}(t)\}^2[1 + C\ddot{f}(t)] \quad (23a).$$

The content of this Eq.(23*a*) is exactly the same as the content $T_T\{f(t)\}$ of Eq.(1).

Thus, the tracing and tracking distortion which actually occurs at the time of reproduction is different from the tracing distortion which has heretofore been considered the object of correction. Therefore, the relationship between g(t) and f(t) indicated previously by Eq.(3) becomes invalid. At the time when a recording signal waveform, which has been subjected to the known measure for compensation for tracing distortion, is recorded, the waveform g(t) is traced with the reproducing stylus of the pickup as follows:

$$g(t) = Tp[T_T^{-1}\{f(t)\}] = f(t) + \frac{\alpha C}{2} A\{\dot{f}(t)\}^3 \quad (25).$$

As indicated by Eq.(25), a tertiary distortion as expressed by Eq.(24) is present.

In order to fully compensate for the tracing and tracking distortion which actually arises at the time of reproduction, a general equation must first be determined for the tracing and tracking distortion which actually occurs. This general equation can be obtained by determining the inverse function $Tp^{-1}\{f(t)\}$ of the function $Tp\{f(t)\}$ representing the tracing distortion which actually arises in the form of Eq.(23). The inverse function $Tp^{-1}\{f(t)\}$ can be derived from $Tp\{f(t)\}$ by resorting to the procedure previously applied for the determination of $T_A\{f(t)\}$ from $Tc\{f(t)\}$. The following Eq.(26) is obtained from the following Eq.(23*b*):

$$Tp\{f(t)\} = g(t) = f(t) + \frac{\alpha C}{2}\{\dot{f}(t)\}^2[1 + A\dot{f}(t) + \alpha C\ddot{f}(t)] \quad (23b)$$

$$f(t) = g(t) - \frac{\alpha C}{2}\{\dot{f}(t)\}^2 - \frac{\alpha C}{2} A\{\dot{f}(t)\}^3 - \frac{\alpha^2 C^2}{2}\{\dot{f}(t)\}^2 \cdot \ddot{f}(t) \quad (26).$$

Furthermore, the following equations are obtained.

$$\dot{f}(t) = \dot{g}(t) - \alpha C\dot{f}(t)\ddot{f}(t) - \frac{3\alpha C}{2} A\{\dot{f}(t)\}^2\ddot{f}(t) - \alpha^2 C^2\dot{f}(t)\{\ddot{f}(t)\}^2 - \frac{\alpha^2 C^2}{2}\{\dot{f}(t)\}^2\dddot{f}(t) \quad (27)$$

$$\ddot{f}(t) = \ddot{g}(t) - \alpha C\{\ddot{f}(t)\}^2 - \alpha C\dot{f}(t)\dddot{f}(t) - 3\alpha CA\dot{f}(t)\{\ddot{f}(t)\}^2 - \frac{3\alpha C}{2} A\{\dot{f}(t)\}^2\dddot{f}(t) - 3\alpha^2 C^2\dot{f}(t)\ddot{f}(t)\dddot{f}(t) - \alpha^2 C^2\{\ddot{f}(t)\}^3 - \frac{\alpha^2 C^2}{2}\{\dot{f}(t)\}^2 f^{(4)}(t) \quad (28)$$

By using Eqs.(27) and (28), the factors f(t), $\dot{f}(t)$, $\ddot{f}(t)$, etc., are eliminated from the right-hand side of Eq.(26), and the following equation (29) is obtained:

$$f(t) = g(t) - \frac{\alpha C}{2}\{\dot{g}(t)\}^2[1 + A\dot{g}(t) - \alpha C\ddot{g}(t)] \quad (29).$$

Then, by substituting $Tp^{-1}\{f(t)\}$ for f(t) and substituting f(t) for g(t), the following expression is obtained:

$$Tp^{-1}\{f(t)\} = f(t) - \frac{\alpha C}{2}\{\dot{f}(t)\}^2[1 + A\dot{f}(t) - \alpha C\ddot{f}(t)] \quad (30).$$

By this Eq.(30), the general equation is obtained for compensation fdistortion.

When the general equation for compensation for the actual tracing and tracking distortion (Eq.(30)) is compared with the conventional general equation for tracing distortion compensation (Eq.(2)), it is observed that the two equations differ from each other. In Eq.(30), the C in Eq.(2) becomes $\alpha$C, and a new term $$-\frac{\alpha C}{2} A\{\dot{f}(t)\}^3,$$

which did not exist in Eq.(2) is added.

Then, $Tp^{-1}\{f(t)\}$ (Eq.(30)) is applied to the original signal f(t) to change its form which the cutter then records in the sound groove. The signal g(t) is obtained at the time when the recorded signal is traced with the reproducing stylus, as follows:

$$g(t) = Tp[Tp^{-1}\{f(t)\}] \equiv f(t) \quad (31).$$

As indicated in the above Eq.(31), the signal g(t) becomes the same as the original signal f(t), which means that the original signal is faithfully reproduced.

When the quantities such as $\alpha$, C, and A in Eq.(30) are expressed by actual physical quantities, Eq.(30) becomes as follows:

$$Tp^{-1}\{f(t)\} = f(t) - \frac{r\cos\theta}{2V^2}\{\dot{f}(t)\}^2\left[1 + \frac{\sin\theta}{V}\dot{f}(t) - \frac{r\cos\theta}{V^2}\ddot{f}(t)\right] \quad (32)$$

where:

r is the radius of the tip of the reproducing stylus;

V is the relative linear velocity of the sound groove; and $\theta$ is the cutting angle of the cutter.

In accordance with the present invention, the recording signal is recorded in the form indicated by the above Eq.(32). The recording can be carried out in practice by a system as described below with reference to block diagram FIG. 10.

Figure 10:
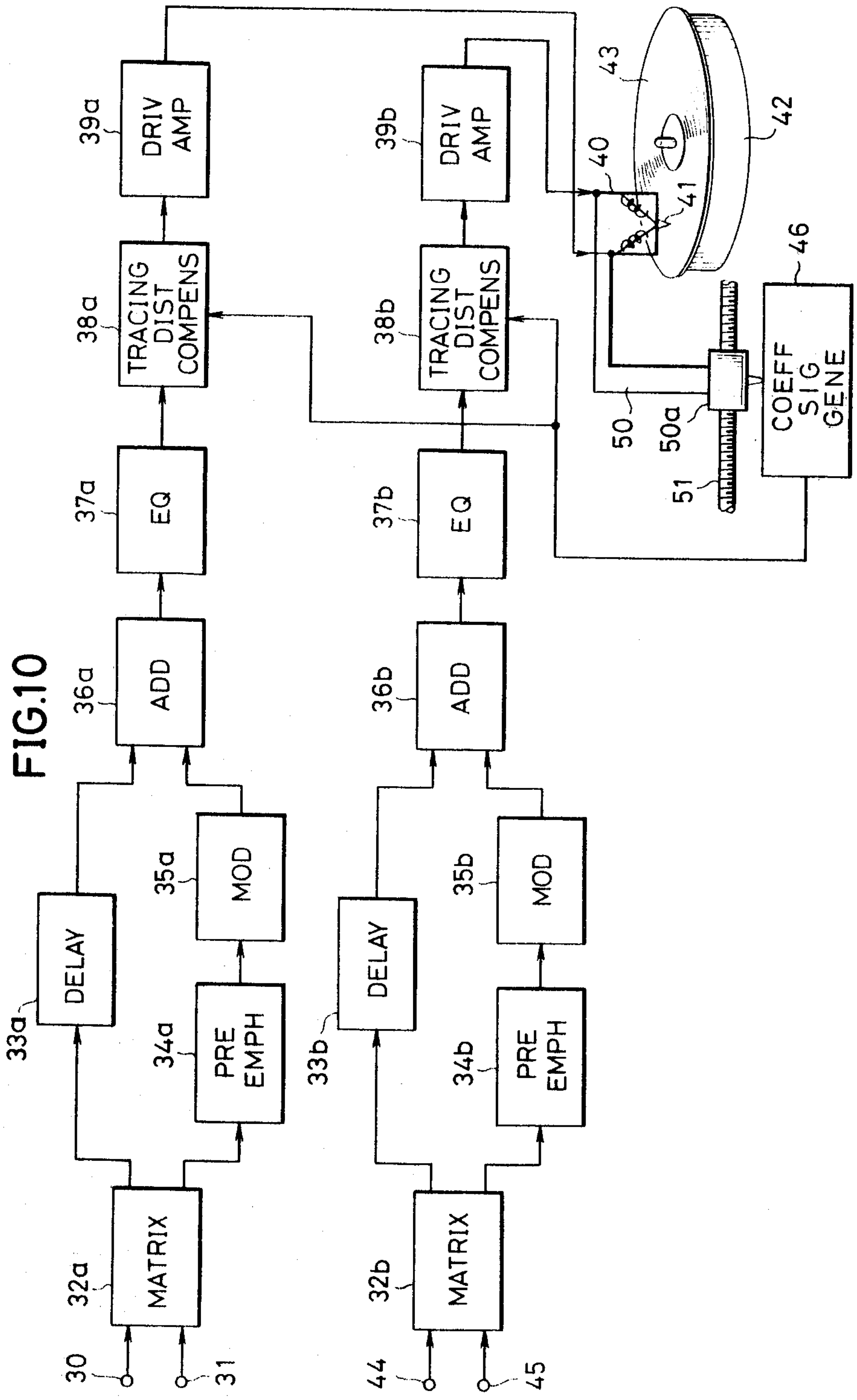
FIG. 10 is a block schematic diagram showing one embodiment of the record disc recording system, according to the present invention.

In the system illustrated in FIG. 10, first and second channel signals are introduced through input terminals 30 and 31 and supplied to a matrix circuit 32*a*. The matrixed output includes a sum signal and a difference signal of these two signals. The sum signal from the matrix circuit 32*a* passes through a delay circuit 33*a* and an adding circuit 36*a*. The difference signal from the matrix circuit 32*a* passes through a pre-emphasis circuit 34*a* and an angle modulator 35*a* . The angle-modulated wave difference signal produced by the modulator 35*a* is supplied to the adding circuit 36*a*, where it is added to the above mentioned direct-wave sum signal. The two signals are thus multiplexed.

The multiplexed signal produced as output of the adding circuit 36*a* is passed through an equalizer 37*a* having an RIAA equalizer characteristic and supplied to a tracing and tracking distortion compensation circuit 38*a*, constituting an essential part of the system of the present invention. There, the multiplexed signal is transformed into a signal indicated by Eq.(32). The output signal thus transformed is amplified in a driving amplifier 39*a* and thereafter supplied to a cutter head 40 to drive the cutting stylus 41. The compensated recording signal is thus recorded by cutting as a left channel signal on one side wall of the sound groove of a record disc 43 on a turntable 42. The cutting stylus 41 has the cutting angle $\theta$.

Third and fourth channel signals introduced through input terminals 44 and 45 are supplied to a matrix circuit 32*b*. There, they are matrixed into a sum signal and a difference signal. These signals pass through and are processed by a right channel system which is the same as the above described left channel system. The block components of the right channel are designated by the same reference numerals as corresponding components in the left channel system, but they have the subscript b in place of the subscript a. The output signal of the right channel driving amplifier 39*b* is supplied to the same cutter head 40 and recorded on the other side wall of the sound groove, as a right channel signal of the record disc 43.

As the cutter head 41 moves inwardly from the outer periphery of the record disc 43, a coefficient signal is supplied from a coefficient signal generating circuit 46 simultaneously to the tracing and tracking distortion compensation circuits 38*a* and 38*b*.

Figure 11:
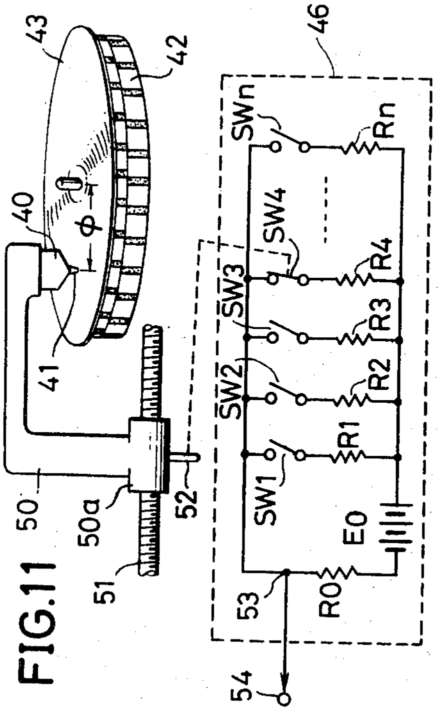
FIG. 11 is a combination of a schematic mechanical diagram and an electrical circuit diagram showing one example of a coefficient signal generating circuit.

The coefficient signal generating circuit 46 is similar to that indicated in FIG. 11, for example. The cutter head 40 is supported at the distal end of a support arm 50. The opposite end or base part 50*a* engages a horizontal feed screw 51. As the feed screw 51 rotates, the support arm 50 is fed inwardly. The cutter head 40 is moved continuously inwardly from the outer periphery of the record disc 43 as it records by means of cutting stylus 41.

The base part 50*a* of the support arm 50 has a finger or an actuating, bar 52 for actuating one-by-one, normally-open switches SW1, SW2, . . . SWn in the coefficient signal generating circuit 46. In this circuit 46, these switches are respectively connected in series with resistors R1, R2 . . . Rn having the same subscripts. The series-connected combinations of switches and resistors are connected mutually parallel to a common power source Eo and a resistor Ro.

As the support arm 50 travels, the normally-open switches SW1 through SWn are closed in succession, one-by-one, by the actuating bar 52. Only one switch is closed at a time. When a switch SWk, for example, is closed, the corresponding resistor Rk is connected in parallel with the resistor Ro, with respect to the junction 53 between the switches SW1 through SWn and the resistor Ro. Therefore, the voltage at the junction 53 becomes (Ro/Ro + Rk)Eo.

The resistance values of the resistors R1 through Rn are selected so that, when the cutting stylus 41 is at a position on the record disc 43 at a distance $\phi$ (groove radius) from the center of the disc, the voltage at the terminal 54 is analogous to $1/\phi$. Accordingly, as the cutting stylus 41 moves inwardly over the record disc 43 from the outer periphery thereof, a coefficient signal appears at terminal 54. The coefficient has a voltage corresponding to 1/V, with respect to the relative linear velocity V of the cutting stylus 41 relative to the record disc 43, at each position of the cutting stylus 41.

In the coefficient signal generating circuit 46, a variable resistor may be used instead of the plurality of switches S1 through Sn and resistors R1 through Rn. The variable resistance value varies with the movement of the actuating bar 52.

Figure 12:
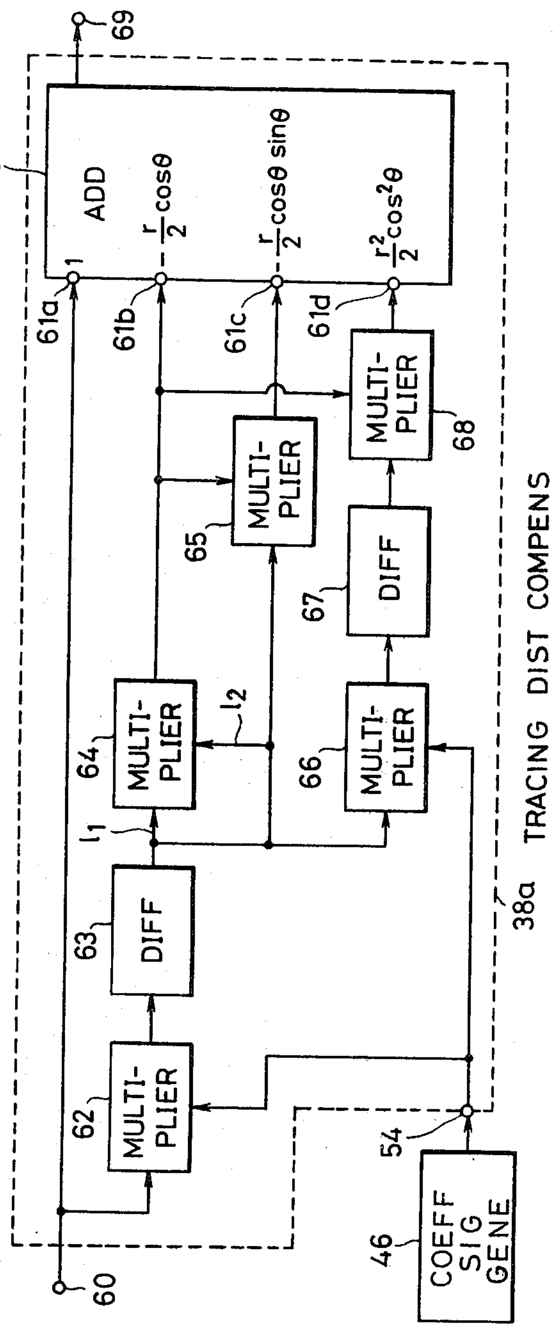
FIG. 12 is a block diagram of one embodiment of a tracing and tracking distortion correction circuit.

FIG. 12 shows one embodiment of the tracing and tracking distortion compensation circuit 38*a*, constituting an essential part of the present invention. Since the tracing and tracking distortion compensation circuit 38*b* is the same circuit 38*a*, the illustration and description thereof are omitted.

In FIG. 12, the signal f(t) from the equalizer 37*a* is introduced through an input terminal 60 and supplied to an input terminal 61*a* of a coefficient weighting adder 61 in this tracing and tracking distortion compensation circuit 38*a*. There, it is weighted by the coefficient 1 (unity). The signal f(t) from the input terminal 61*a* is also supplied to a multiplier 62, where it is multiplied with the coefficient signal 1/V supplied from the coefficient signal generating circuit 46 through the terminal 54. The output signal f(t)/V of the multiplier circuit 62 is differentiated by a differentiator 63 resulting output signal f(t)/V is supplied as a multiplier through a line l1 and as a multiplicand through a line l2, respectively, to a multiplexer 64. The output signal $\{\dot{f}(t)\}^2/V^2$ of the multiplier 64 is supplied to an input terminal 61*b* of the coefficient weighted adder 61 and is weighted by a coefficient $-(r/2)\cos\theta$.

To a multiplier 65, the output signal $\{\dot{f}(t)\}^2/V^2$ of the multiplier 64 is supplied as a multiplier. At the same time, the output signal $\dot{f}(t)/V$ of the differentiator 63 is supplied as a multiplicand, to the multiplier 65. The output signal $\{\dot{f}(t)\}^3/V^3$ of the multiplier 65 is supplied to an input terminal 61*c* of the coefficient weighting adder 61, where it is weighted by a coefficient $-(r/2)\cos\theta\sin\theta$.

Furthermore, the output signal $\dot{f}(t)/V$ of the differentiator 63 is supplied also to a multiplier 66. There, it is multiplied with a coefficient signal 1/V supplied from the coefficient signal generating circuit 46. The output signal $\dot{f}(t)/V^2$ of the multiplier 66 is differentiated by a differentiator 67. The resulting differentiated output signal $\ddot{f}(t)/V^2$ is supplied as a multiplicand to a multiplier 68. The output signal $\{\dot{f}(t)\}^2/V^2$ of the multiplier 64 is supplied as a multiplier to the multiplier 68. The resulting output signal $\{\dot{f}(t)\}^2\ddot{f}(t)/V^4$ of the multiplier 68 is supplied to an input terminal 61*d* of the coefficient weighting adder 61, where it is weighted by a coefficient $(r^2/2)\cos^2\theta$.

The coefficient weighting adder 61 adds the signal f(t) supplied to the input terminal **61*a*** and weighted by a coefficient, the signal $$-\frac{r}{2}\cos\theta\,\frac{\{\dot{f}(t)\}^2}{V^2}$$

supplied to the input terminal **61*b*** and weighted by a coefficient, the signal $$-\frac{r}{2}\cos\theta\sin\theta\,\frac{\{\dot{f}(t)\}^3}{V^3}$$

supplied to the input terminal **61*c*** and weighted by a coefficient, and the signal $$\frac{r^2}{2}\cos^2\theta\,\frac{\{\dot{f}(t)\}^2\ddot{f}(t)}{V^4}$$

supplied to the input terminal **61*d*** and weighted by a coefficient. Consequently, a signal equal to Eq.(32) and expressed by $$f(t)-\frac{r\cos\theta\,\{\dot{f}(t)\}^2}{2V^2}\left[1+\frac{\sin\theta\cdot\dot{f}(t)}{V}-\frac{r\cos\theta\ddot{f}(t)}{V^2}\right]=Tp^{-1}\}$$

is led out through an output terminal 69.

Another embodiment of the tracing and tracking distortion compensation circuit **38*a* will now be described with reference to FIG. 13**.

The signal f(t) is supplied from the equalizer **37*a* through the input terminal 60 to an input terminal 71*a* of a coefficient weighting adder 71 in the tracing and tracking distortion compensation circuit. It is weighted by the coefficient 1 (unity). The signal f(t) is introduced through the input terminal 60 and supplied also to a differentiator 72 and there is differentiated. The resulting output signal $\dot{f}(t)$ of the differentiator 72 is supplied to a multiplier 73, where it is multiplied with the coefficient signal 1/V received from the terminal 54 of the coefficient signal generator 46. The resulting output signal $\dot{f}(t)/V$ of the multiplier 73 is supplied as a multiplier through a line l3 and as a multiplicand through line l4, respectively, to a multiplier 74, where multiplication is performed. The resulting output signal $\{\dot{f}(t)\}^2/V^2$ of the multiplier 74 is supplied to an input terminal 71*b* of the coefficient weighting adder 71**, and is weighted by a coefficient $-(r/2)\cos\theta$.

The output signal $\dot{f}(t)/V$ of the multiplier 73 and the output signal $\{\dot{f}(t)\}^2/V^2$ of the multiplier 74 are respectively supplied to a multiplier 75, where they are multiplied. The resulting output signal $\{\dot{f}(t)\}^3/V^3$ of the multiplier 75 is supplied to an input terminal **71*c* of the coefficient weighting adder 71** and is weighted by a coefficient $-(r/2)\cos\theta\sin\theta$.

The output signal $\{\dot{f}(t)\}^3/V^3$ of the multiplier 75 is differentiated by a differentiator 76. The resulting output signal $3\{\dot{f}(t)\}^2\ddot{f}(t)/V^3$ is supplied to a multiplier 77. The coefficient signal 1/V from the coefficient signal generating circuit 46 is also being supplied to this multiplier 77 and is multiplied by the signal from the differentiator 76. The resulting output signal $3\{\dot{f}(t)\}^2\ddot{f}(t)/V^4$ of the multiplier 77 is supplied to an input terminal **71*d* of the coefficient weighting adder 71** and is weighted by a coefficient $(r^2/6)\cos^2\theta$.

In the coefficient weighting adder 71, consequently, the signals f(t), $$-\frac{r}{2}\cos\theta\,\frac{\{\dot{f}(t)\}^2}{V^2},\ -\frac{r}{2}\cos\theta\sin\theta\,\frac{\{\dot{f}(t)\}^3}{V^3},\ \text{and}$$

$$\frac{r^2}{6}\cos^2\theta\,\frac{3\{\dot{f}(t)\}^2\ddot{f}(t)}{V^4}$$

are added. As a result, a signal equal to Eq.(32) is obtained from the output terminal 69.

This embodiment of the tracing distortion compensation circuit **38*a* is advantageous over that described with reference to FIG. 12**, since one less multiplier is required.

Figure 13:
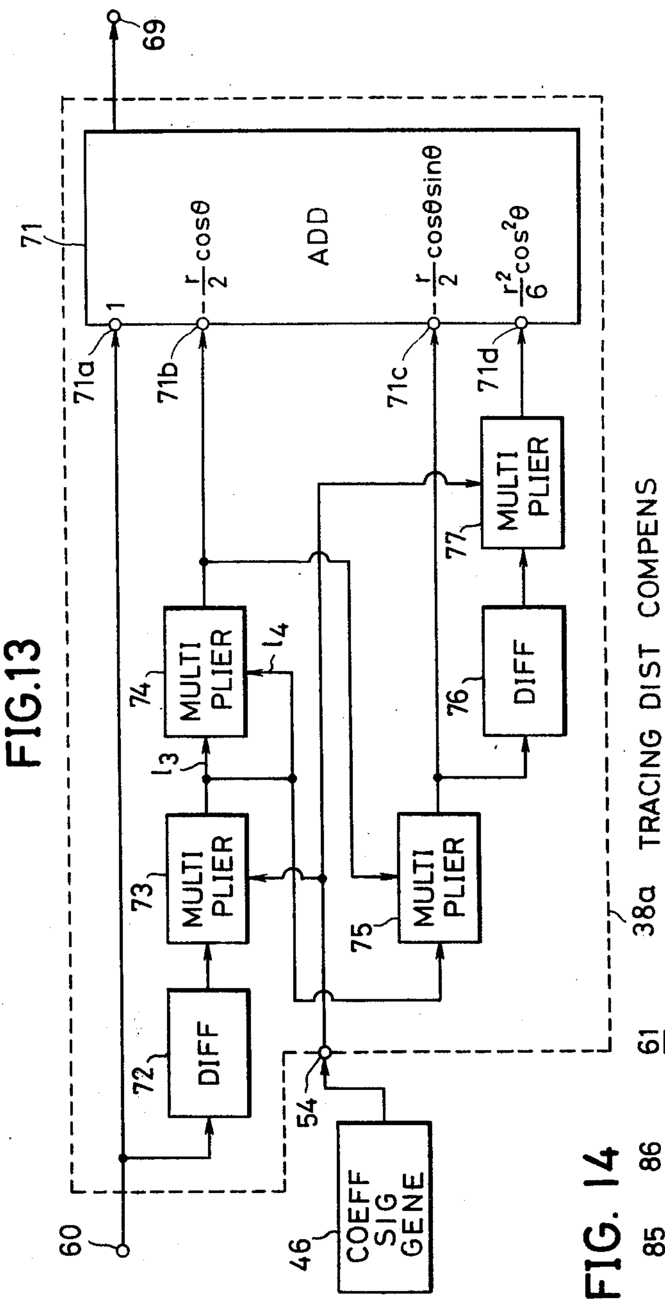
FIG. 13 is a block diagram of another embodiment of a tracing and tracking distortion correction circuit constituting an essential part of the system of the invention.

In the systems of FIGS. 12 and 13, multipliers and differentiators, ordinarily used in the prior art, can be used for the individual multipliers and differentiators. For the coefficient weighting adder 61 (or 71), itself, an ordinary coefficient weighting adder can also be used. One example of a coefficient weighting adder is shown in FIG. 14.

Figure 14:
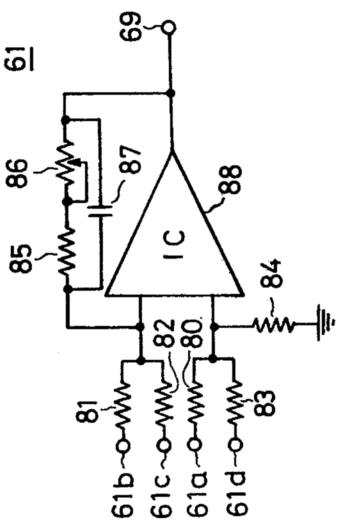
FIG. 14 is circuit diagram of one example of a coefficient adder used in the systems shown by the block diagrams in FIGS. 12 and 13.

In this circuit, with respect to an integrated circuit (IC) 88, resistors 80 through 86 and a capacitor 87 are connected as shown in FIG. 14. The resistors 80 through 83 are respectively connected to the input terminals **61*a* through 61*d*. The coefficients by which the various signals are multiplied when they are added by the adder 61 are set by selecting appropriate resistance values of the resistances 80 through 83**. An example of the constants of the various components of this circuit are as follows:

RESISTORS

81, 82, 83, 84: in the range of 5KΩ through 20 KΩ
84: 2.2 KΩ
85: 2 KΩ
86: 50 KΩ

CAPACITOR

87: 3 PF.

It is to be understood that the present invention is applicable not only to a record disc recording system of the discrete system but also to the record disc recording system of a conventional 2-channel stereo system.

Further, this invention is not limited to these embodiments but variations and modifications may be made without departing from the scope and spirit of the invention.

What is claimed is:

1. A record disc recording system comprising:

means for supplying an input signal f(t) to said system for causing said system to record on a record disc;

cutter means having a cutting angle $\theta$ for recording by cutting on a record disc;

tracing and tracking distortion compensation means for producing an output signal $Tp^{-1}\{f(t)\}$ as expressed by the equation:

$$T_p^{-1}\{f(t)\}=f(t)-\frac{r\cos\theta}{2V^2}\{\dot{f}(t)\}^2\left[1+\frac{\sin\theta\cdot\dot{f}(t)}{V}-\frac{r\cos\theta\cdot\ddot{f}(t)}{V^2}\right],$$

where r is the radius of the tip of a stylus used for reproducing the signal recorded on the disc;

V is the linear velocity of the reproducing stylus relative to the sound groove of the record disc;

$\dot{f}(t)$ equals $d\{f(t)\}/dt$; and $\ddot{f}(t)$ equals $d\{\dot{f}(t)\}/dt$;

said tracing and tracking distortion compensation means having a coefficient weighting adder means for weighting a plurality of signals by a plurality of predetermined coefficients and adding the weighted quantities; and means responsive to the signal $Tp^{-1}\{f(t)\}$ for driving said cutter means in order to record a signal on the record disc.

2. A record disc recording system as claimed in claim 1 in which said means for supplying a recording signal comprises: matrix circuit means for forming a sum signal and a difference signal responsive to two channel signals; circuit means for angle modulating said difference signal; and circuit means for multiplexing the sum signal of a direct wave and the difference signal thus angle modulated and for supplying the resulting multiplexed signal as the recording signal f(t) to said tracing distortion compensation means.

3. A record disc recording system as claimed in claim 1 in which said tracing and tracking distortion compensation means comprises: transforming circuit means responsive to the input signal f(t) which is supplied to the system for transforming said input signal f(t) respectively into a first signal $\{\dot{f}(t)\}^2/V^2$, a second signal $\{\dot{f}(t)\}^3/V^3$, and a third signal $\{\dot{f}(t)\}^2\ddot{f}(t)/V^4$; said coefficient weighting adder means weighting said first signal from the transforming circuit means by a coefficient ($-r\cos\theta$), weighting said second signal by a coefficient ($-r\cos\theta\sin\theta$), weighting said third signal by a coefficient ($r^2\cos^2\theta$), and adding the resulting quantities thus obtained to the input signal f(t) thereby to produce the output signal $Tp^{-1}\{f(t)\}$; and coefficient signal generating means for generating a coefficient signal 1/V in accordance with the radial position of the cutter means on the record disc and supplying the same to said transforming circuit means.

4. A record disc recording system as claimed in claim 3 in which said transforming circuit means comprises: first differentiator means for differentiating the recording signal $\dot{f}(t)$; first multiplier means for multiplying the resulting output signal f(t) of said first differentiator means and the coefficient signal 1/V from said coefficient signal generating means; second multiplier means for multiplying by itself the resulting output signal $\dot{f}(t)/V$ of said first multiplier means; third multiplier means for multiplying the resulting output signal $\dot{f}(t)/V$ of said first multiplier means and the resulting output signal $\{\dot{f}(t)\}^2/V^2$ of said second multiplier means; second differentiator means for differentiating the resulting output signal $\{\dot{f}(t)\}^3/V^3$ of said third multiplier means; and fourth multiplier means for multiplying the resulting output signal $3\{\dot{f}(t)\}2\ \ddot{f}(t)/V^3$ of said second differentiator means and the coefficient signal 1/V from said coefficient signal generating means, said coefficient weighting adder means for weighting the output signal $\{\dot{f}(t)\}^2/V^2$ of said second multiplier means by a coefficient ($-r/2\cos\theta$), weighting the output signal $\{\dot{f}(t)\}^3/V^3$ of said third multiplier means by a coefficient ($-r/2\cos\theta\sin\theta$), weighting the output signal $3\{\dot{f}(t)\}^2\ddot{f}(t)/V^4$ of said fourth multiplier means by a coefficient ($r^2/6\cos^2\theta$), and adding the resulting quantities thus obtained and the recording signal f(t).

5. A record disc recording system as claimed in claim 3 in which said coefficient signal generating means comprises means including an actuating member which moves together with said cutter in the radial direction over said record disc and electrical circuit means responsive to said movement of said actuating member to generate a coefficient signal of a voltage 1/V in accordance with the position of said cutter in the radial direction of said record disc.

6. A record disc recording system as claimed in claim 3 in which said transforming circuit means comprises: first multiplier means for multiplying the recording signal f(t) and the coefficient signal 1/V from said coefficient signal generating means; first differentiator means for differentiating the resulting output signal $\dot{f}(t)/V$ of said first multiplier means; second multiplier means for multiplying by itself the resulting output signal $\dot{f}(t)/V$ of said first differentiator means; third multiplier means for multiplying the resulting output signal $\dot{f}(t)/V$ of the first differentiator means and the resulting output signal $\{\dot{f}(t)\}^2/V^2$ of said second multiplier means; fourth multiplier means for multiplying the resulting output signal $\dot{f}(t)/V$ of the first differentiator means and the coefficient signal 1/V from said coefficient signal generating means; second differentiator means for differentiating the resulting output signal $\dot{f}(t)/V^2$ of said fourth multiplier means; and fifth multiplier means for multiplying the resulting output signal $\ddot{f}(t)/V^2$ of said second differentiator means and the resulting output signal $\{\dot{f}(t)\}^2/V^2$ of said second multiplier means, said coefficient weighting adder means operating to weight the output signal $\{\dot{f}(t)\}^2/V^2$ of said second multiplier means by a coefficient ($-r/2\cos\theta$), to weight the output signal $\{\dot{f}(t)\}^3/V^3$ of said third multiplier means by a coefficient ($-r/2\cos\theta\sin\theta$), to weight the output signal $\{\dot{f}(t)\}^2\ddot{f}(t)/V^4$ of said fifth multiplier means by a coefficient ($r^2/2\cos^2\theta$), and to add the resulting quantities thus obtained and the recording signal f(t).

* * * * *